UNITED STATES PATENT OFFICE.

CHARLES J. EAMES, OF NEW YORK, N. Y., ASSIGNOR TO GEORGE N. GARDNER, OF SAME PLACE.

IMPROVEMENT IN PROCESSES FOR PRESERVING WOOD.

Specification forming part of Letters Patent No. 134,133, dated December 24, 1872.

*To all whom it may concern:*

Be it known that I, CHARLES J. EAMES, of New York, in the county of New York, in the State of New York, have invented a new and Improved Process for Preserving Wood; and I do hereby declare that the following is a full and exact description thereof.

The nature of my invention consists in an improved process for preserving wood by means of cresylic acid, carbolic acid, or equivalent substances, when freed from all tarry matter and applied as hereinafter more fully set forth.

To enable others skilled in the arts to prepare the materials necessary to the practice of my improved process, I will now proceed with the description.

I take the pure acids, and, by the application of the required amount of heat, form them in solution, and, in cold weather, to prevent the temperature of the solution from falling so low as to endanger crystallization, I add a small quantity of naphtha. Having the acid thus prepared in solution, I apply it to posts and logs that are new, in the following manner: The posts and logs are stripped of their bark, and, with a brush or other suitable means, I apply a coat of the acid solution, and when that has been absorbed I put on a second coat, and so on until there has been sufficient of the acid absorbed—about four or five coats being sufficient. When this is accomplished I then spread a coat of "black varnish" over the last application of acid, to more effectually seal the wood from the action of the atmosphere. This coat of varnish in some instances may be dispensed with. The posts or logs thus treated are then pierced with several large auger-holes, which form recesses that are sufficiently capacious to contain from two to four ounces each of the acid solution, which is poured into them and secured therein by means of plugs. Soon the solution is absorbed into the very center of the posts or logs, and so more thoroughly preserving the wood. These holes are bored in the ends and sides of the logs, those bored in the sides being formed at an angle of about forty-five degrees. I then stand the logs thus treated on end, in a vessel containing a portion of the acid, for several hours—three to four—allowing the acid to be taken up in the posts by capillary attraction; but this part of the process may be dispensed with, as in the case of telegraph-poles. When the telegraph-poles have been set up, I can, without taking them down, apply the acid solution by boring holes in the poles near the surface of the soil in which they are set, filling such holes with acid, and securing the acid in said holes by means of plugs.

In the case of railway ties in use, I bore several holes on the top of each tie, fill each hole with acid, and plug up each hole.

The railway ties, wooden blocks for pavements, &c., may be immersed several times in a solution of the acid, and so preserve the wood. By these and other similar ways I apply the solution.

Having thus fully described my invention, what I claim as new, and desire to secure by Letters Patent, is—

The process herein described for preserving wood, the same consisting in impregnating it with a solution of cresylic or carbolic acids by the means herein named, or other substantially equivalent means.

CHARLES J. EAMES.

Witnesses:
V. C. CLAYTON,
S. G. CLAYTON.